United States Patent [19]

Wentworth, Jr.

[11] 4,136,887
[45] Jan. 30, 1979

[54] BELLOWS TYPE MECHANICAL SEAL

[75] Inventor: Robert S. Wentworth, Jr., Temecula, Calif.

[73] Assignee: Borg-Warner Corporation, Chicago, Ill.

[21] Appl. No.: 839,479

[22] Filed: Oct. 4, 1977

[51] Int. Cl.² .............................................. F16J 15/36
[52] U.S. Cl. ........................................ 277/43; 277/88; 277/93 SD; 277/189
[58] Field of Search ..................................... 277/88–91, 277/126, 101, 166, 188 R, 189, 93 R, 93 SD, 1, 9, 40–43

[56] References Cited

U.S. PATENT DOCUMENTS

| | | |
|---|---|---|
| 1,876,520 | 9/1932 | Newkirk et al. ............ 277/88 X |
| 2,080,403 | 5/1937 | Homan ........................ 277/88 |
| 2,122,378 | 6/1938 | McCormack ................ 277/88 X |
| 2,389,528 | 11/1945 | McConaghy .................. 277/90 |
| 2,394,012 | 2/1946 | Rayburn ..................... 277/89 X |
| 2,713,504 | 7/1955 | Coleman ....................... 277/43 |
| 2,881,014 | 4/1959 | Amirault et al. ............ 277/89 |
| 3,388,913 | 6/1968 | Tracy .......................... 277/89 X |
| 3,391,942 | 7/1968 | Wilson ......................... 277/89 |
| 3,526,408 | 9/1970 | Tracy .......................... 277/88 |
| 3,776,560 | 12/1973 | Wentworth .................. 277/88 |

FOREIGN PATENT DOCUMENTS

| | | | |
|---|---|---|---|
| 230697 | 3/1925 | United Kingdom ....................... 227/89 |
| 611345 | 10/1948 | United Kingdom ....................... 277/88 |
| 812046 | 4/1959 | United Kingdom ....................... 277/89 |
| 1144482 | 3/1969 | United Kingdom ................ 277/93 SD |

*Primary Examiner*—Robert S. Ward, Jr.
*Attorney, Agent, or Firm*—Aubrey L. Burgess

[57] ABSTRACT

A mechanical seal assembly associated with a rotatable shaft means and comprising a pair of seal rings, one stationary and one rotatable with the shaft means, the seal rings having generally radially disposed engaging faces. A bellows means connected to the stationary seal ring resiliently urges it toward the rotatable ring. Resilient means locating the position of the rotatable seal ring resiliently counters the resilient force on said stationary ring by the bellows means. The entire seal assembly is on a sleeve which can be assembled with a shaft or removed therefrom as a unit.

4 Claims, 3 Drawing Figures

U.S. Patent
Jan. 30, 1979
4,136,887
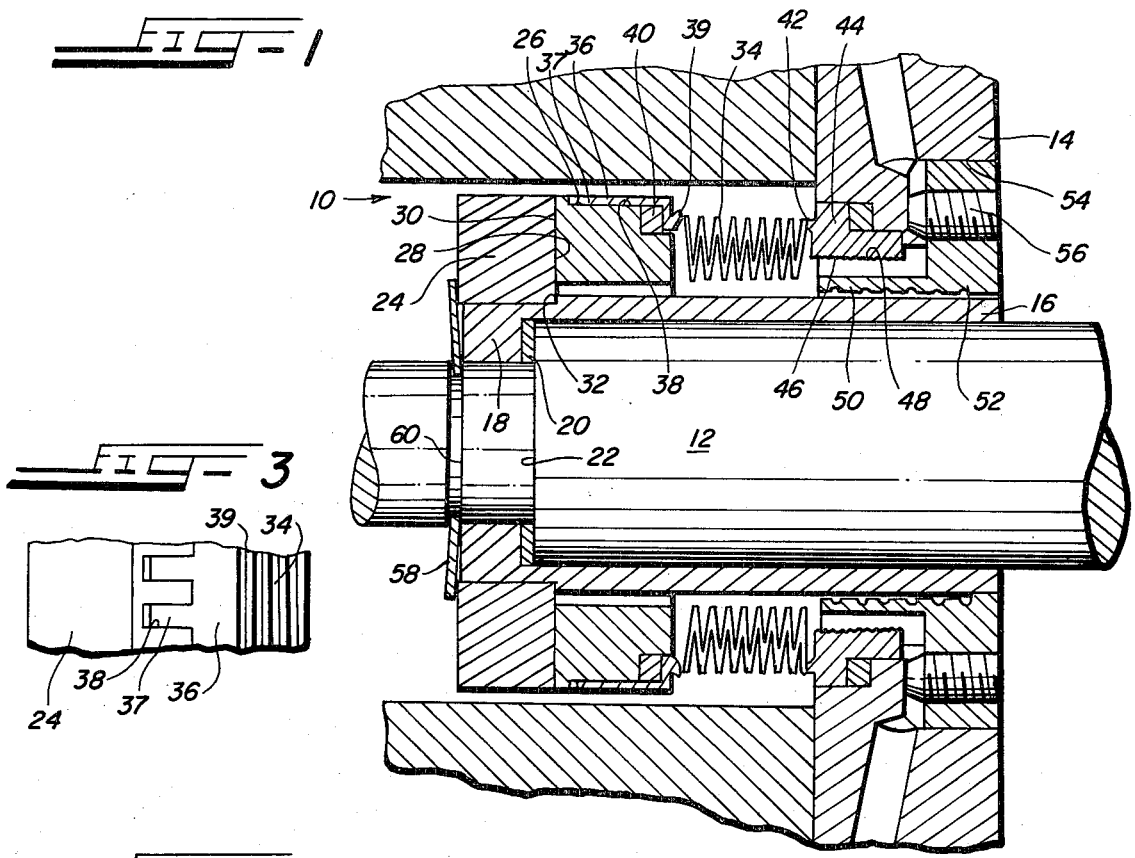
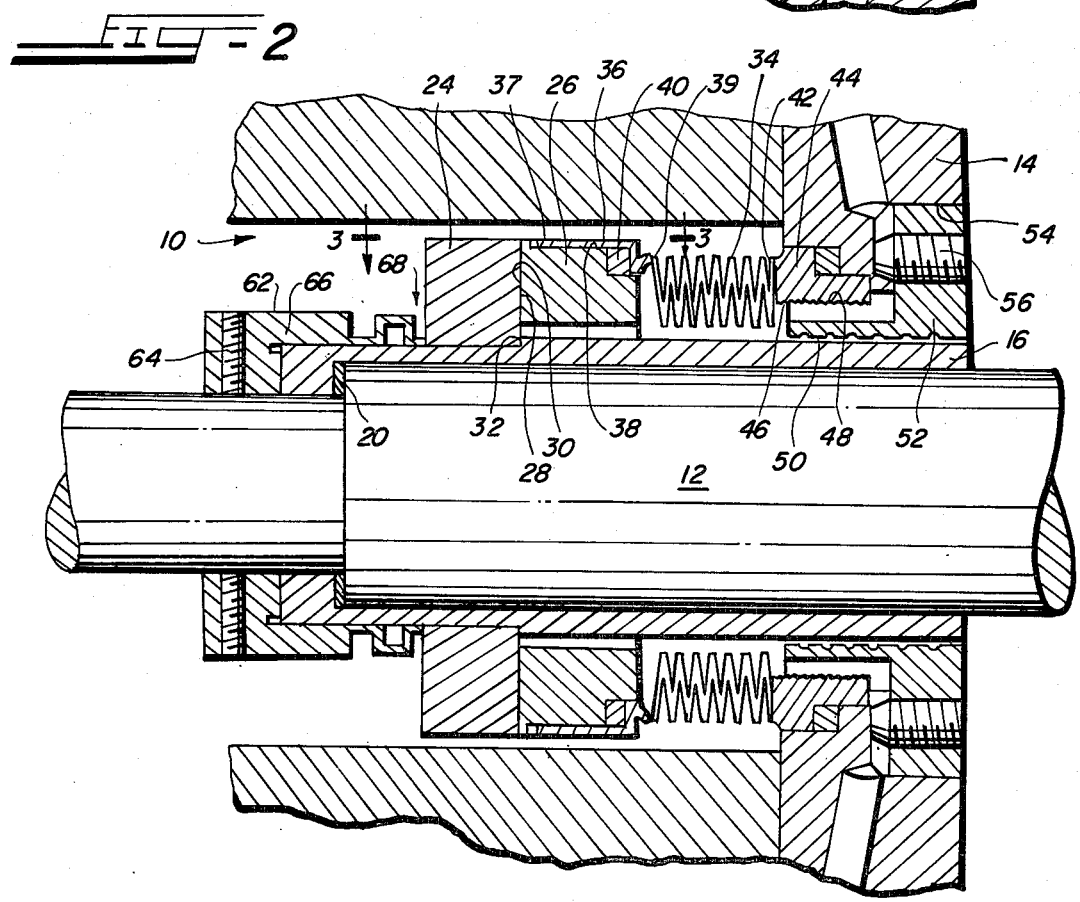

BELLOWS TYPE MECHANICAL SEAL

BACKGROUND OF THE INVENTION

Mechanical seal assemblies of a pair of seal rings with engaging faces are well known. One of the seal rings is generally connected to a rotatable shaft and the other is generally fixed to a housing through which the shaft passes. Thus the seal rings are known as rotatable and stationary seal rings. The use of bellows constructed of multiple annulii welded together is also well known in the mechanical seal art, especially for high temperature environments. Generally, bellows means are associated with the rotating seal ring, leading to difficulties because of the effect of centrifugal force thereon.

In addition, many seal assemblies employ various parts which are clamped by set screws, to the rotating shaft, each part having surfaces contacting surfaces of other parts which in the absence of precision lapping may permit leakage thereacross.

THE INVENTION

According to this invention a relatively simple mechanical seal assembly is provided for association with a rotatable shaft, which assemply comprises a pair of seal rings having generally radially disposed or transverse contacting faces, one ring being rotatable with the shaft and the other ring being stationary. The stationary seal ring is connected to a bellows means which resiliently urges the connected stationary seal ring toward the rotating seal ring. A resilient means associated with the shaft axially locates the seal assembly on the shaft and also provides a load on the rotating seal ring.

The resilient locating means may be a disc spring and the like or a collar having a corrugated terminus which acts like a spring and engages the rear of the rotating seal ring.

The rotating seal ring may be assembled on a sleeve surrounding the rotatable shaft making the structure easily replaceable as a unit. The stationary seal ring may be associated with an anti-coking collar, as is known in the art.

THE DRAWINGS

FIG. 1 is a partial sectional view of a first embodiment of this invention;

FIG. 2 is a partial sectional view of a second embodiment of this invention; and FIG. 3 is a detail of the ferrule and seal ring assembly.

DETAILED DESCRIPTION

A first embodiment of the invention is illustrated in FIG. 1 of the drawing. There is shown a mechanical seal assembly, generally identified as 10, which is associated with a rotary shaft 12 and a seal flange 14. The seal assembly also comprises a rotary sleeve 16 having an enlarged terminal end 18 received around a portion of the shaft 12 of reduced diameter. An annular gasket 20, preferably of metal, is disposed between the end 18 of the sleeve 16 and a shoulder 22 of the shaft 12.

The seal assembly 10 also comprises a pair of seal rings 24 and 26 having generally radially disposed engaging seal faces 28 and 30, respectively.

The seal ring 24 is rotatable with the shaft 12 and the sleeve 16 and abuts a shoulder 32 on the sleeve 16 while the seal ring 26 is stationary and is connected to a bellows 34. The bellows 34 applies a resilient force to the seal ring 26, urging it toward the seal ring 24. This force is augmented by the pressure differential existing between the sealed fluids. The connection between the seal ring 26 and the bellows comprises a metal ferrule 36 slip fit on the ring 26 and having fingers 37 engaging grooves 38 to prevent relative rotation therebetween, see FIG. 3. The ferrule 36 also has a projecting rim 39 welded to the bellows 34. An annular gasket 40 is disposed between a portion of the ferrule 36 and the ring 26.

The bellows 34, constructed, for example, of annular elements welded together, is welded to an annular bead 42 of a bellows support ring 44. The latter is internally threaded at 46 to be received by a threaded portion 48 on an annular neck 50 of an anti-coking device or anti-spark bushing 52. The bushing 52 is totally or partially of non-ferrous material and is received in an annular cavity 54 in the flange 14. The use of such bushings is well known in the mechanical seal art. An adjusting screw 56 bears against a portion of the flange 14 permitting the adjustment of the position of the bushing 52 and thus the seal ring 26.

In order to locate the seal assembly properly relative to the shaft 10 and also to load the seal, a spring means 58 is used. The spring is preferably annular, such as a disc spring, and is received in a slot 60 in the shaft 12 and bears against the end 18 and the seal ring 24.

Attention is now invited to the second embodiment of the invention illustrated in FIG. 2. The same reference characters are used to refer to like parts. In this embodiment, the spring 58 of FIG. 1 is not used, the structure requires a longer sleeve 16. In order to locate and load the seal, a collar 62 is used which collar comprises an annular portion 64 surrounding the shaft and an annular flange 66 terminating in a spring-like, corrugated terminus 68. The collar is fixed to the shaft 10 in any suitable manner, for example, the sleeve 16 can be grooved to receive a snap ring or the collar can be tapped to receive a set screw. The terminus 68 of the collar is compressed when assemblying the seal and by so doing the seal ring 26 is loaded. As in the FIG. 1 embodiment, the assembly can be removed from the shaft as a unit, the unit including the sleeve and the other associated parts.

I claim:

1. A mechanical seal assembly adapted to be associated with a rotatable shaft and a fixed housing and which is assembled and removed as a unit with respect to the shaft comprising:

a sleeve having a reduced portion defining a shoulder and adapted to surround and be rotatable with said shaft;

a rotatable seal ring surrounding said reduced portion of said sleeve and resiliently urged into engagement with said shoulder;

spring means adapted to engage said shaft and said rotatable seal ring resiliently urging said rotatable seal ring into engagement with said shoulder;

a stationary seal ring surrounding said sleeve;

engaging seal faces on said seal rings;

a bellows means connected at one end to said stationary seal ring;

said bellows means being so constructed and arranged to exert a resilient force on said stationary seal ring to urge it toward said rotatable seal ring; and a ring member adapted to be connected to said housing;

said bellows means being connected at its other end to said ring member.

2. A mechanical seal assembly as recited in claim 1 in which said spring means comprises a disc spring.

3. A mechanical seal assembly as recited in claim 1 in which said resilient means comprises a collar member having a spring-like terminus abutting said rotatable seal ring.

4. A mechanical seal assembly as recited in claim 3 in which said spring-like terminus comprises corrugations on said sleeve members.

* * * * *